United States Patent
Schaftlein et al.

(10) Patent No.: US 7,805,725 B2
(45) Date of Patent: Sep. 28, 2010

(54) SYSTEM AND METHOD FOR SYNCHRONIZING SYSTEM MODULES

(75) Inventors: Richard C. Schaftlein, Johnson City, TN (US); Daniel F. Moon, Johnson City, TN (US)

(73) Assignee: Siemens Industry, Inc., Alpharetta, GA (US)

( * ) Notice: Subject to any disclaimer, the term of this patent is extended or adjusted under 35 U.S.C. 154(b) by 779 days.

(21) Appl. No.: 10/667,060

(22) Filed: Sep. 22, 2003

(65) Prior Publication Data

US 2004/0117535 A1    Jun. 17, 2004

Related U.S. Application Data

(60) Provisional application No. 60/413,715, filed on Sep. 26, 2002.

(51) Int. Cl.
G06F 9/46 (2006.01)
G06F 9/44 (2006.01)
G06F 13/24 (2006.01)

(52) U.S. Cl. ............ 718/104; 718/105; 717/168; 717/169; 717/170; 717/171; 710/260; 710/261; 710/266

(58) Field of Classification Search .......... 719/327, 719/321, 312; 718/104, 105; 709/220, 221, 709/226, 229; 717/168–171; 700/18; 710/260, 710/266
See application file for complete search history.

(56) References Cited

U.S. PATENT DOCUMENTS

| | | | |
|---|---|---|---|
| 5,038,318 A | | 8/1991 | Roseman |
| 5,748,468 A | * | 5/1998 | Notenboom et al. ........... 700/3 |
| 6,301,612 B1 | * | 10/2001 | Selitrennikoff et al. ...... 709/220 |
| 6,658,465 B1 | * | 12/2003 | Touboul ..................... 709/223 |
| 6,675,226 B1 | * | 1/2004 | Nair et al. .................... 709/250 |
| 6,711,605 B2 | * | 3/2004 | Sekiguchi et al. ........... 718/100 |
| 6,725,260 B1 | * | 4/2004 | Philyaw ..................... 709/220 |
| 6,996,828 B1 | * | 2/2006 | Kimura et al. .............. 719/319 |
| 7,047,449 B2 | * | 5/2006 | Pfeifer et al. ................. 714/41 |
| 2003/0041088 A1 | * | 2/2003 | Wilson et al. ............... 709/104 |
| 2003/0154337 A1 | * | 8/2003 | Ohno et al. ................. 710/260 |
| 2004/0088710 A1 | * | 5/2004 | Ronkka et al. .............. 718/107 |

(Continued)

FOREIGN PATENT DOCUMENTS

WO     WO 01/69335 A2    9/2001

OTHER PUBLICATIONS

Marsh et al., First-class user-level threads, ACM Symposium on Operating Systems Principles, pp. 110-121, Year of Publication: 1991.*

(Continued)

*Primary Examiner*—H. S Sough
*Assistant Examiner*—Phuong N Hoang
(74) *Attorney, Agent, or Firm*—Jose de la Rosa (57) ABSTRACT

A method and system is provided for automatically reassigning an interface card and devices associated with the interface card in a programmable logic controller system from a non-deterministic operating environment to a deterministic operating environment so that the change is performed essentially instantaneously to avoid disruption of operations of the PLC devices associated with the interface involved in the reassignment. All operating system registries and configurations are automatically performed. The move provides for an improved response time for devices associated with and controlled by the card.

31 Claims, 10 Drawing Sheets

U.S. PATENT DOCUMENTS

2005/0010924 A1* 1/2005 Hipp et al. .................. 718/104

OTHER PUBLICATIONS

Ghosh et al., Resource management of the OS network subsystem, Object-Oriented Real-Time Distributed Computing, 2002. (ISORC 2002), Apr. 29-May 1, 2002 pp. 271-279.*

Cheng, "Real Time Systems: Scheduling, Analysis, and Verification", Book, Aug. 12, 2002, 42 (4 pages total) page(s), John Wiley & Sons, Inc., US.

Halang, "Real-Time Systems: Implementation of Industrial Computerised Process Automation", Book, Jan. 1, 1992, 3, 119, and 297 (5 pages total) page(s), World Scientific Publishing Co. Pte. Ltd., US.

Jensen, "Guest Editors' Introduction to Special Section on Asynchronous Real-Time Distributed Systems", IEEE Transactions on Computers, Aug. 1, 2002, 881-882 page(s), Vol. vol. 51, No. 8, IEEE.

Jensen, "Panel: Real-Time Application Domain Visionaries", Third IEEE International Symposium on Object-Oriented Real-Time Distributed Computing, Jan. 1, 2000, 1 page(s), IEEE.

* cited by examiner

| Station Manager CP Modules | | | | x |
|---|---|---|---|---|
| Name | Type | Location | Configuration | |
| CP5613 (Slot 1) | CP5613 | PC Slot 1 | PG/PC Interface | |
| | | | | |
| | | | | |
| | | | | |
| | | | | |
| | | | | |

| OK | Cancel |
|---|---|

SYSTEM AND METHOD FOR SYNCHRONIZING SYSTEM MODULES

CROSS-REFERENCE TO RELATED APPLICATIONS

This application claims the benefit of U.S. Provisional Patent Application No. 60/413,715, filed on Sep. 26, 2002, incorporated by reference herein, in its entirety.

DESCRIPTION

BACKGROUND OF THE INVENTION

1. Field of the Invention

The invention generally relates to automatically reassigning an interface card and devices between operating environments, and more particularly, to automatically reassigning interface cards and devices in a programmable logic controller system from a non-deterministic operating environment to a deterministic operating environment.

2. Background Description

Programmable Logic Controllers (PLCs) typically include a customized piece of hardware that has an instruction set geared for the industrial control 5 industry. This piece of hardware is often referred to as a Hard PLC. The programming language is usually ladder logic or some other language that typically resembles assembly language. The programs (control programs) usually involve the manipulation of memory areas in the PLC that are tied through other specialized pieces of hardware (I/O modules) to machinery such as, for example, switches, pumps, motors, machines, etc. These I/O modules are usually mounted on a rack and can be accessed over a network.

In recent years, the control industry has expanded to take advantage of the power of the Personal Computer (PC). A Soft PLC is a software version of the Hard PLC. Instead of having actual circuitry boards that execute the control program, a software program that runs on the PC executes the program. Additional cards can be inserted into the PC chassis to allow for access to the I/O modules. The Soft PLC will interface with these cards which in turn interface with the I/O modules.

There is another version of the PLC called a Slot PLC. This is a piece of hardware which is in the form of a card that can be inserted into the PC's chassis. The Slot PC behaves like a Hard PLC and has a limited amount of accessibility to other applications on the PC.

Typically, an operating system such as, for example, Windows® (Windows® is a registered trademark of Microsoft Corporation) is used as the environment for the PLC application software to run under and interact with the I/O devices. This environment is a non-deterministic environment and essentially non-real time. However, over time, as the devices or operational requirements of the equipment being controlled changes, the demands on the operating system may become overtaxed and often cannot meet more demanding real-time constraints for new equipment or new requirements for the equipment being controlled. Often this may be simply due to more equipment, for example, on the PLC I/O interfaces vying for more application processing time.

SUMMARY OF THE INVENTION

In an aspect of the invention, a method is provided for reassigning resources in a soft programmable logic controller (PLC). The method includes the steps of selecting an interface in a first operating environment, selecting a virtual slot in a second operating environment for installation of the interface, creating an installation file in the first operating environment for installation of the interface in the second operating environment, and installing the interface in the second operating environment using the installation file to reassign a resource between the first operating environment and the second operating environment.

In another aspect of the invention, a method for automatically reassigning resources in a soft programmable logic controller is provided. The method comprises the steps of identifying a resource to be reassigned from a first processing mode to a second processing mode, and removing the resource from operation in the first processing mode. Further included are the steps of creating an installation file containing information of at least one device driver, assigning the resource for operation in the second operating mode by using installation parameters associated with the first operating mode, and automatically installing the at least one device driver for the resource in the second processing mode using the information from the installation file so that any device in communication with the at least one device driver remains functional.

In another aspect of the invention, a system for reassigning resources in a soft programmable logic controller (PLC) is provided. The system includes a means for selecting an interface in a first operating environment, a means for selecting a virtual slot in a second operating environment for installation of the interface, a means for creating an installation file in the first operating environment for installation of the interface in the second operating environment, and a means for installing the interface in the second operating environment using the installation file to reassign a resource between the first operating environment and the second operating environment.

In another aspect of the invention, a computer program product comprising a computer usable medium having readable program code embodied in the medium is provided. The computer program product includes a first software component to select an interface in a first operating environment, a second software component to select a virtual slot in a second operating environment for installation of the interface, a third software component to create an installation file in the first operating environment for installation of the interface in the second operating environment, and a fourth software component to install the interface in the second operating environment using the installation file to reassign a resource between the first operating environment and the second operating environment.

BRIEF DESCRIPTION OF THE DRAWINGS

The foregoing and other objects, aspects and advantages will be better understood from the following detailed description of embodiments of the invention with reference to the drawings, in which.

DETAILED DESCRIPTION OF EMBODIMENTS OF THE INVENTION

This invention is directed to a system and method of extending the operational processing capability of a PC-based PLC by automatically reassigning devices from one operating system configuration to another, e.g., a non-deterministic to a deterministic operating environment. As demands on real-time processing increase on a PC-based PLC, for example, due to addition of controlled devices that interact and control industrial machinery of various types, re-configuration of devices from an essentially non-real-time mode to an essentially real-time mode may provide necessary real time performance to assure adequate response times to and from the controlled devices. The invention provides such real time performance and response times by assuring that the resources are adequately allocated between operating environments that control industrial machinery, for example, reassigning resources in a seamless and automatic manner. The reassignment provides for peak servicing and control of the industrial devices.

Figure 1:
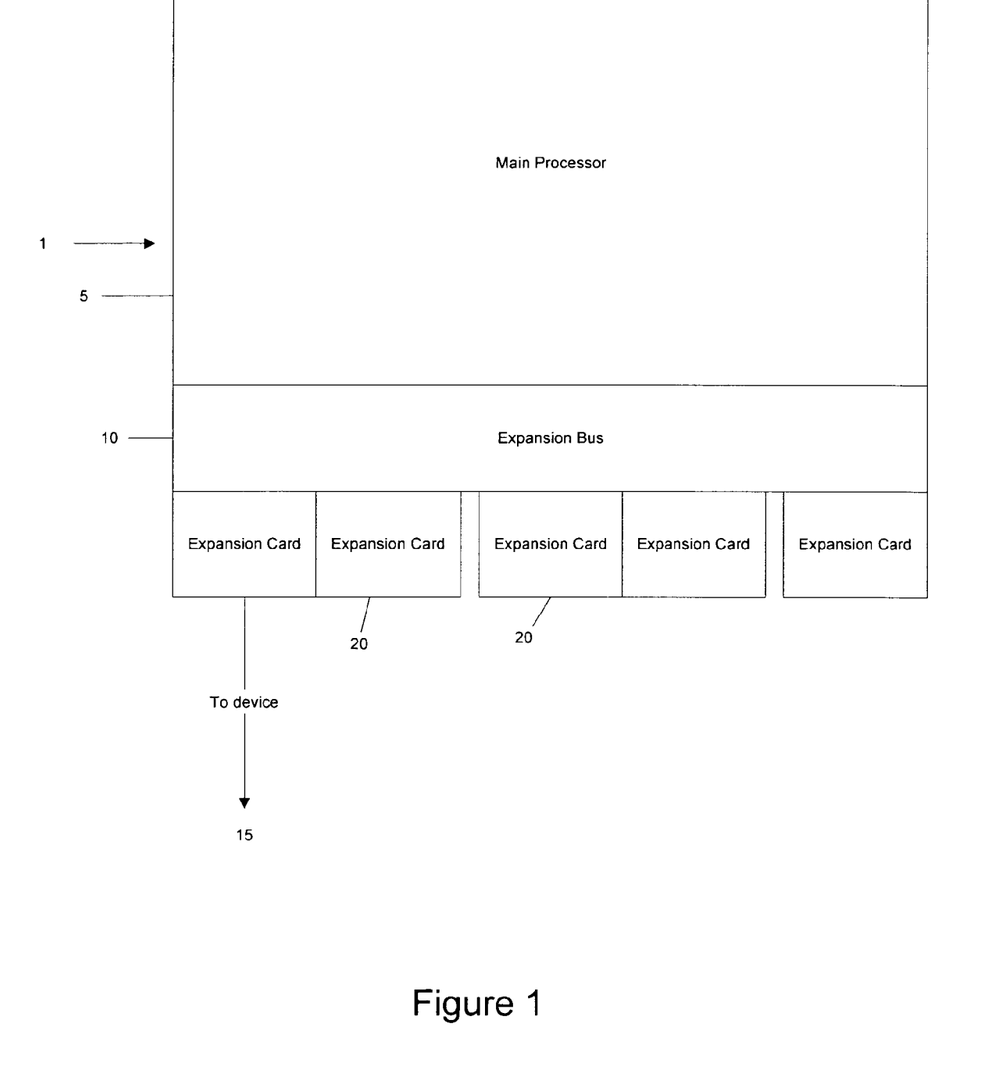
FIG. 1 is a diagram of an exemplary PC-based PLC environment.

FIG. 1 is a diagram of an exemplary PC-based PLC environment, generally denoted by reference numeral 1. A PC Station 5 includes an expansion bus 10 with PC slots 20 that accept board based Slot PLCs, interfaces to Hard PLCs, or interface adaptor cards for soft PLC implementations. Communications 15 for interfacing and controlling devices in a manufacturing environment, or the like, are provided by each board in the PC slots 20, as necessary. The communications 15 may include various network interfaces and topologies, e.g., Ethernet or PROFIBUS-DP (IEC 61158), in communication with controlled devices.

Figure 2:
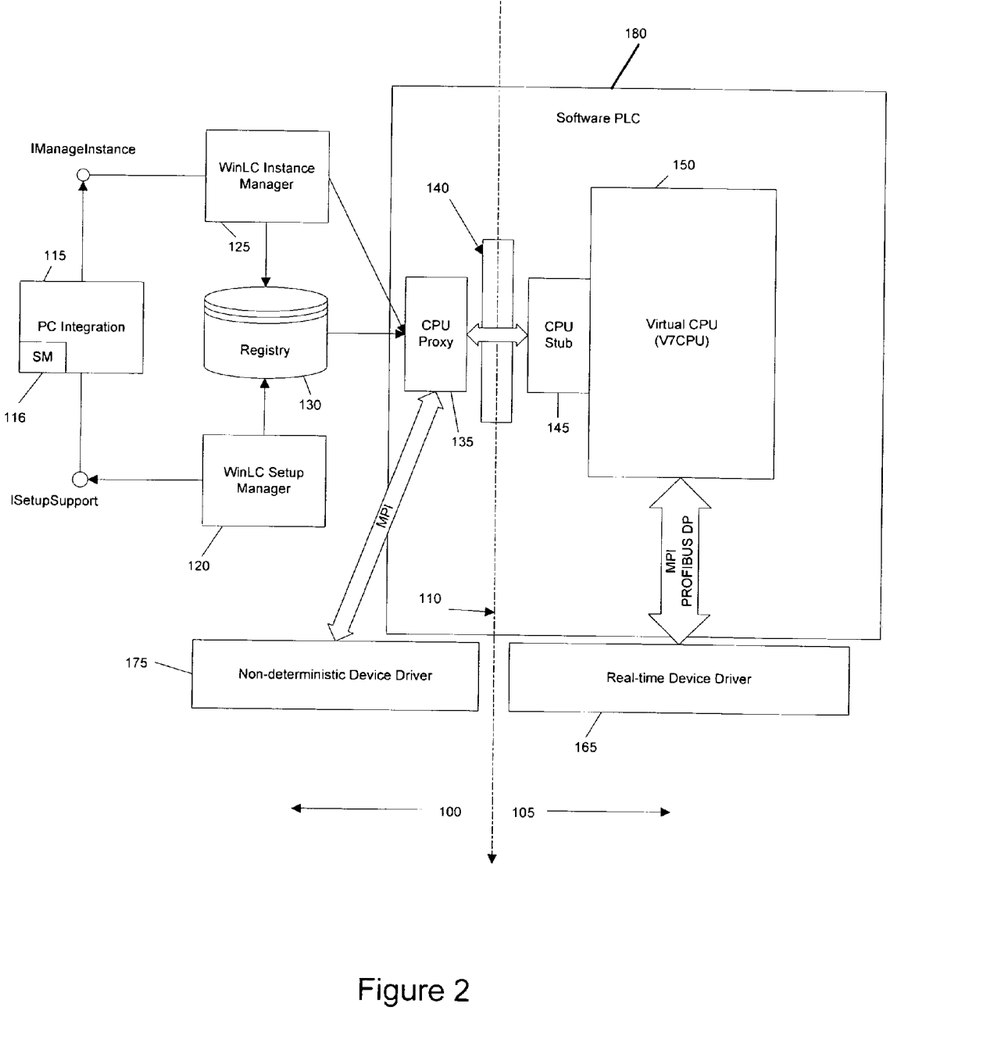
FIG. 2 is an illustration of software architecture of an embodiment of the invention.

FIG. 2 illustrates the software architecture of an embodiment of the invention. In embodiments of the invention, the Microsoft Windows operating system is referenced and used as an example; however, other non-deterministic environments may also be used and are contemplated by the invention. The software architecture of FIG. 2 may be implemented on the PC-based environment of FIG. 1. FIG. 2 is separated into two halves, 100 and 105, by the dashed line 110, representative of two operating system modes. The left hand side, denoted generally by reference numeral 100, is the non-deterministic (non-deterministic herein refers to timing within the WinLC execution of the program; timing can vary from scan to scan in 100, scanning includes a cycle of communication to all devices) operating environment that supports, for example, graphical user interfaces and general-purpose computing.

The right hand side of FIG. 2, denoted by reference numeral 105, is deterministic and the scan cycle timing is fixed (non-variable) and provides a real-time execution environment used for processes requiring real-time sensitive processing. In this example, the Venturcom Real-Time Extensions for Windows (RTX) is referenced and used as an example. The use of the operating system and extensions are provided as examples and illustrative purposes and are not intended as limiting features of the invention.

The Windows environment 100 includes a PC Integration component 115, which defines interfaces such as ISetupSupport and IManageinstance so that PC-based PLC applications may create and manage instances of system components. A portion of the PC Integration component 115 is realized by a Station Manager (SM) component 116. This SM component 116 provides the graphical user interface (GUI) for defining PLC parameters and configurations including the instances of system components. WinLC Setup Manager 120 provides for installation of a software PLC component. This software PLC component is identified to the SM 116 by its component name, which is entered into a registry 130. The registry 130, typically representative of a file, include entries that establish the existence of software PLC components in the system by name and may be called upon by the SM 116.

Table 1 shows an exemplary entry in the WinLC component registry 130.

TABLE 1

| Line | Registry Entry |
|---|---|
| L1 | [HKEY_LOCAL_MACHINE\SOFTWARE\SIEMENS\StationManager\Components\WinLC] |
| L2 | "VmdID"=dword:00000002 |
| L3 | "ObjID"=dword:0014175c |
| L4 | "CatalogEntry"="WinLC" |
| L5 | "Param"="" |
| L6 | "Status"=dword:00000002 |
| L7 | "Flags"=dword:00000002 |
| L8 | "Invalid"=dword:00000000 |
| L9 | "Databasesize"=dword:00004000 |

A component name is found in line L1 as "WinLC" of type found in L4 (WinLC). This entry establishes the existence of a component with the name "WinLC." For each instance of WinLC configured, L1 through L9 will exist with a unique name found on L1.

WinLC Instance Manager 125 provides for creating and managing one or more instances of the software PLC 180 components as directed by the Station Manger 120. These instances may be implemented as one or more software applications.

Still referring to FIG. 2, a software PLC 180 comprises two major components: i) a CPU proxy 135, which manages user interaction with the software PLC; and, ii) an execution engine, comprising a CPU Stub 145 and a Virtual CPU 150. The CPU Proxy 135 runs on the non-deterministic 100 side of the system while the execution engine runs on the real-time side 105 of the system. These two halves of the software PLC application communicate bi-directionally through a shared memory arrangement 140. The CPU proxy 135 and its associated execution engine are instantiated for every instance of the software PLC 180.

In the invention, the CPU proxy 135 coordinates the control and communication of events to and from the non-deterministic 100 side and the real-time side 105. For example, the CPU Proxy 135 might command the execution engine to start or stop execution or the execution engine might notify the CPU proxy 135 of a fault condition to be displayed on an operator panel. The communication across the non-determinist and real-time boundary 110 may be accomplished through the shared memory arrangement 140, or similar arrangement. The CPU stub 145 provides the linkages to the virtual CPU instance 150 (also known as V7 CPU) of the real-time side 105.

By using components such as 135, 140, 145, the invention is capable of reassigning control from the non-deterministic side 100 to the deterministic side 105 (and like version) to ensure proper allocation and efficient use of resources in the soft PLC environment. The reassignment may be performed based on various reasons such as slowing of response time to devices associated with the non-deterministic side, user action, segregation of certain devices by environment, critical demands of certain device operations, prioritization of devices, etc.

The real-time operating system on the real-time side 105 provides multiple threads of execution to enable more real-time oriented processing since each thread may receive a unique priority and may receive higher priority over the non-deterministic side 100 processing, as necessary. By moving time-sensitive portions of the application from the non-deterministic side 100 to the real-time 105 side, real-time demands may be better achieved and achieved more dependably. Reassignment of system resources, e.g., device drivers 165 with their interface cards, from the non-deterministic side 100 to the real-time side 105 is performed automatically with minimal user intervention (shown in FIG. 6).

Figure 3:
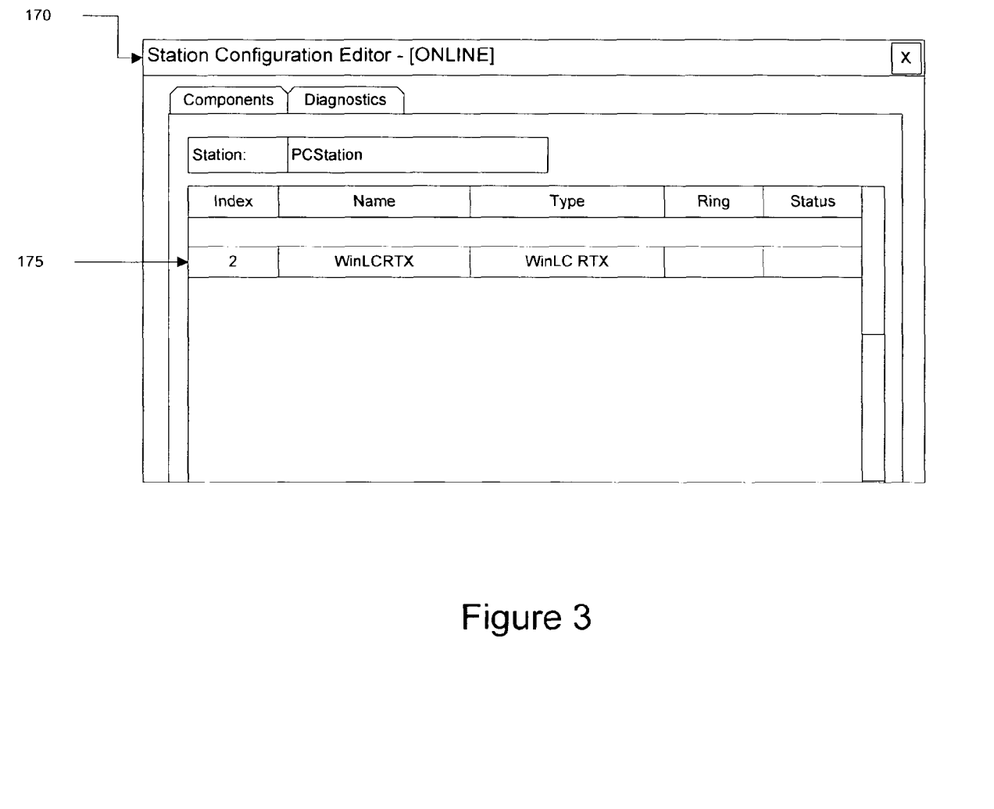
FIG. 3 is example of a Station Manager's GUI interface screen, according to the invention.

FIG. 3 is an example of a SM's 116 GUI interface screen 170 for assigning or modifying an entry in the component registry 130. As illustrated, the second entry 175 shows that a component with the name WinLC has been created. By clicking on this entry, further parameters and configuration of WinLC may be made.

Table 2 shows a WinLC registry entry associated with component WinLC

TABLE 2

| | |
|---|---|
| L1 | [HKEY_LOCAL_MACHINE\SOFTWARE\SIEMENS\WINLC] |
| L2 | "Product_Version"="" |
| L3 | "Product_Key"="_Basis" |
| L4 | [HKEY_LOCAL_MACHINE\SOFTWARE\SIEMENS\WINLC\DP5x11] |
| L5 | [HKEY_LOCAL_MACHINE\SOFTWARE\SIEMENS\WINLC\DP5x11\CP5611(PROFIBUS)] |
| L6 | [HKEY_LOCAL_MACHINE\SOFTWARE\SIEMENS\WINLC\DP5x11\CurrentVersion] |
| L7 | [HKEY_LOCAL_MACHINE\SOFTWARE\SIEMENS\WINLC\DP5x11\DeviceID] |
| L8 | "*SIE9020"="YES" |
| L9 | [HKEY_LOCAL_MACHINE\SOFTWARE\SIEMENS\WINLC\DP5x11\General] |
| L10 | [HKEY_LOCAL_MACHINE\SOFTWARE\SIEMENS\WINLC\DP5x11\General\Setup] |
| L11 | "InstLangs"="B" |
| L12 | "InstComps"="" |
| L13 | "BaseLangs"="B" |
| L14 | "BaseComps"="" |
| L15 | [HKEY_LOCAL_MACHINE\SOFTWARE\SIEMENS\WINLC\Installed Instance] |
| L16 | [HKEY_LOCAL_MACHINE\SOFTWARE\SIEMENS\WINLC\Installed Instance\WINLC0] |
| L17 | "UserNameForInstance"="WinLC" |
| L18 | "VmdID"=dword:00000002 |
| L19 | "StartAtPCBoot"=dword:00000000 |
| L20 | "Instance Type"="_BASIS" |
| L21 | "pwd"="" |
| L22 | "SecurityLevel"=dword:00000000 |
| L23 | "Active File Path"="C:\\SIEMENS\\WINAC\\WinLC\\WINLC0.waf" |
| L24 | "Background Processing Priority"=dword:00000003 |
| L25 | "Foreground Processing Priority"=dword:00000005 |
| L26 | "I/O Type"="DP" |
| L27 | "Interrupt Priority"=dword:00000006 |
| L28 | "Min Scan Sleep(ms)"=dword:0000000a |
| L29 | "OB Execute Priority"=dword:00000004 |
| L30 | "OB Sleep Interval(us)"=dword:000003e8 |
| L31 | "OB Wake Interval(us)"=dword:00002328 |
| L32 | "Process Priority"=dword:00000003 |
| L33 | "RemoteHost"="" |
| L34 | "Startup Mode"="MANUAL" |
| L35 | [HKEY_LOCAL_MACHINE\SOFTWARE\SIEMENS\WINLC\Installed Instance\WINLC0\Sub-Modules] |
| L36 | "IF1"="CP5611(PROFIBUS)" |
| L37 | "IF2"="" |
| L38 | "IF3"="" |
| L39 | "IF4"="" |
| L40 | [HKEY_LOCAL_MACHINE\SOFTWARE\SIEMENS\WINLC\_Basis] |
| L41 | "Cyclic Interrupt OB Overrun Depth"=dword:0000001e |
| L42 | "Display Update(ms)"=dword:00000064 |
| L43 | "InstanceRegPath"="SIEMENS\\WINLC\\Installed Instance" |

TABLE 2-continued

| | |
|---|---|
| L44 | "K-Bus Driver Path"="s7wltonx.dll" |
| L45 | "ProxyCPU Name"="s7wlcapx.exe" |
| L46 | "VirtualCPU Name"="s7wlcvmx.exe" |
| L47 | "ShowDebugFaceplateInRel"="off" |
| L48 | "Version"="4.0" |
| L49 | "Path"="C:\\SIEMENS\\WINAC" |
| L50 | [HKEY_LOCAL_MACHINE\SOFTWARE\SIEMENS\WINLC\_Basis\Addons] |
| L51 | [HKEY_LOCAL_MACHINE\SOFTWARE\SIEMENS\WINLC\_Basis\Addons\ExtensionDLLs] |
| L52 | "ODK"="s7odkvmx.dll" |
| L53 | [HKEY_LOCAL_MACHINE\SOFTWARE\SIEMENS\WINLC\_Basis\CurrentVersion] |
| L54 | [HKEY_LOCAL_MACHINE\SOFTWARE\SIEMENS\WINLC\_Basis\Drivers] |
| L55 | [HKEY_LOCAL_MACHINE\SOFTWARE\SIEMENS\WINLC\_Basis\Drivers\CP5611] |
| L56 | "CP Control Path"="s7wlcdpx.dll" |
| L57 | "DP Library Path"="s7wlcdpx.dll" |
| L58 | "TPI Library Path"="s7wltonx.dll" |
| L59 | [HKEY_LOCAL_MACHINE\SOFTWARE\SIEMENS\WINLC\_Basis\Drivers\CP5613_5614] |
| L60 | "CP Control Path"="EpDiagEx.dll" |
| L61 | "DP Library Path"="DPLib_5613.dll" |
| L62 | TPI Library Path"="s7wltonx.dll" |
| L63 | [HKEY_LOCAL_MACHINE\SOFTWARE\SIEMENS\WINLC\_Basis\General] |
| L64 | [HKEY_LOCAL_MACHINE\SOFTWARE\SIEMENS\WINLC\_Basis\General\InstLanguages] |
| L65 | "Applications"="ENGLISH,GERMAN,FRENCH," |
| L66 | [HKEY_LOCAL_MACHINE\SOFTWARE\SIEMENS\WINLC\_Basis\General\Languages] |
| L67 | "Current"="ENGLISH" |
| L68 | [HKEY_LOCAL_MACHINE\SOFTWARE\SIEMENS\WINLC\_Basis\General\Paths] |
| L69 | "Product_Dir"="C:\\SIEMENS\\WINAC" |
| L70 | "Product_Bin_SDir"="WinLC" |
| L71 | "Product_Short_Dir"="C:\\SIEMENS\\WINAC" |
| L72 | "Example_Dir"="C:\\SIEMENS\\WINAC\\Examples" |
| L73 | [HKEY_LOCAL_MACHINE\SOFTWARE\SIEMENS\WINLC\_Basis\General\RelVersion] |
| L74 | "ReleaseVersion"="4.0" |
| L75 | [HKEY_LOCAL_MACHINE\SOFTWARE\SIEMENS\WINLC\_Basis\General\Setup] |
| L76 | "InstLangs"="BAC" |
| L77 | "InstComps"="" |
| L78 | "BaseLangs"="BAC" |
| L79 | "BaseComps"="" |
| L80 | "FolderName"="PC Based Control" |
| L81 | "Restart"="NO" |
| L82 | [HKEY_LOCAL_MACHINE\SOFTWARE\SIEMENS\WINLC\_Basis\General\UserInfo] |
| L83 | "Name"="Siemens" |
| L84 | "Company"="Siemens" |
| L85 | |

Table 2 defines many attributes and parameters for the internal instance named "WinLCO" as defined in line L16. Line L15 through L34 defines the WinLC instance. Line L17 defines the user recognizable name "WinLC". This is the same name as defined in Table 1, line L4. An entry in Table 1, L1 through L9, corresponds to an entry in Table 2, L16 through L34. Lines L16 through L40 are unique to each WinLC instance configured in the SM 116.L4 through L14 define initialization parameters for the CP Card and the language used by any dialog or message that may appear to the user. L40 through L85 define locations of program files, initialization parameters, default operating modes, and language used by any dialog or message that may appear to the user for each WinLC instance.

Table 3 shows the instance specific registry keys that the WinLC Instance Manger 125 creates, modifies and deletes as necessary in response to a SM 116 directive. A unique instance specific registry key is created using the names defined in Table 3 whenever a WinLC instance is added to the system. All WinLC instances of all WinLC product types are managed by the WinLC Instance Manger 125 and are defined under the "Installed Instance" registry location (L15) as defined in Table 2 above.

TABLE 3

WinLC
WinLC1
WinLC2
...

Figure 4:
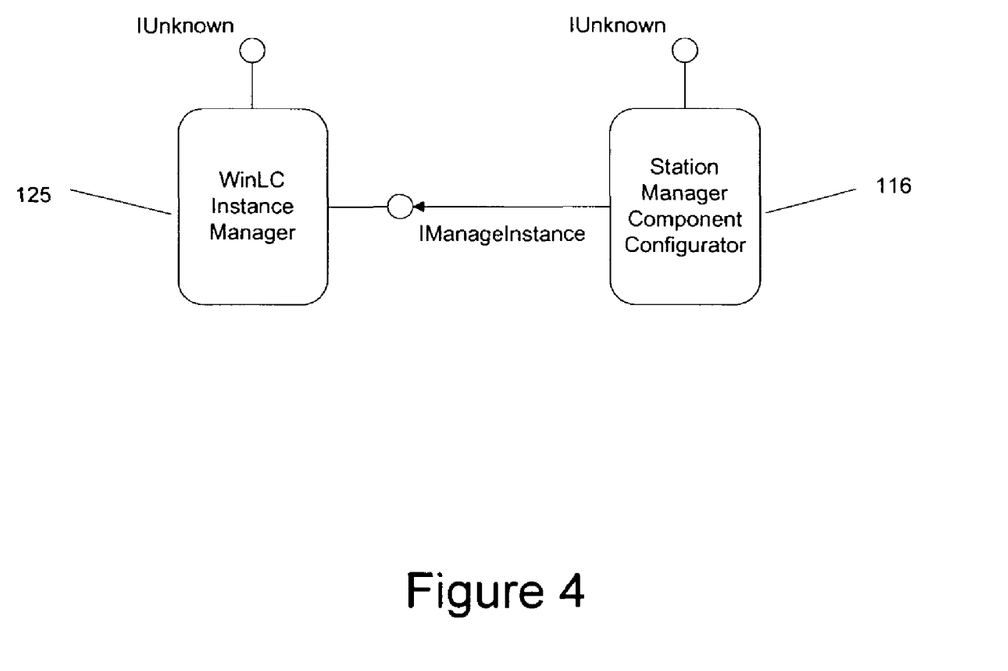
FIG. 4 is a flow diagram representing the relationship of a Station Manager Component Configurator with a WinLC Instance Manager.

FIG. 4 is a flow diagram representing the relationship of a SM Component Configurator with a WinLC Instance Manger 125. As depicted in FIG. 4, the SM 116 calls the IMangeInstance interface of the WinLC Instance Manger 125 for any additions, modifications, and/or deletions of WinLC instances. The WinLC Instance Manager 125 can create, modify, and/or delete the instance specific registry key in response to a SM Component Configurator. When a WinLC instance is added to the PC Station 5, a unique instance specific registry key is created using the names defined in Table 3.

Other entries of the WinLC Registry entry of Table 2 are created by the WinLC Instance Manager. For example, the WinLC Instance Manager creates the "StartAtPCBoot" (L19) (defaulted to be false), the "UserNameForInstance" (L17) (from the user defined name that is shown in the name column on the SM Component Configuration Editor of FIG. 3), the "VmdID" (L18) (the index value on the SM Component Configurator), and the "Instance Type" (L20). The remaining entries under the "installed Instance" key are created the first time the WinLC Instance is run.

The WinLC Instance Manager 125 manages the instances of all WinLC product types on a single PC Station 5. In embodiments, all WinLC Instances are located under the "Installed Instance" registry location as defined above in Table 2. The WinLC Instance Manager may implement the IManageInstance interface of the SM 116. The SM 116 calls the IManageInstance interface of the WinLC Instance Manager 125 for any additions, modifications, and/or deletions of WinLC instances on the PC Station 5.

The WinLC Instance Manager 125 also creates a menu entry in the PC Start Menu for each configured WinLC Instance (Start>Simatic>PC Based Control>WinLC, where WinLC is the user defined name for the WinLC Instance. It also creates an icon on the PC Desktop for each configured WinLC Instance (desktop icon named WinLC, where WinLC is the user defined name for the WinLC Instance). The menu entries and desktop icons are created when a WinLC Instance is added, they are modified when a WinLC Instance is edited, and they are removed when a WinLC Instance is deleted from the SM 116. The menu entries may appear in the GUI of FIGS. 5A-5E.

The WinLC user-program (control software) is created and maintained using an engineering system (for example, the Siemens STEP 7 product, which is the graphical tool for programming the WinLC). The engineering system communicates with WinLC using a communication protocol that provides for program upload, download, and debug, control variable monitoring, alarming, etc. (this protocol may include, for example, the Siemens Multi-Point Interface, or MPI) Additionally, a WinLC instance communicates with its distributed I/O over a process field-bus network, e.g., PROFIBUS-DP. Both of these networking functions are implemented using communications processor (CP) cards 20 which plug into the expansion bus (backplane) 10 of the PC 5.

The association between a given CP card and its WinLC instance is made when the user places the CP card into the PC Station using the SM application. A CP card may be inserted into the PC Station in one of two logically-distinct ways: as a component of the PC Station's virtual backplane or as a submodule of the WinLC instance. The user operation which accomplishes the insertion is performed using graphical interfaces and is similar to installing a module in a rack of a hard PLC.

After a CP card has been configured as a component of the PC Station 5, it can be used for MPI communications, for example, to download a program from the engineering system to the WinLC instance. The WinLC instance accesses CP cards that are installed as components of the PC Station's 5 virtual backplane and slots using software protocols that emulate the backplane of a hard PLC, e.g., a Siemens S7 400. These software protocols operate on the essentially non-deterministic side 100 of the environment. Consequently, they are accessed through the CPU Proxy 135 and CPU Stub 145.

A CP card that has been configured as a submodule of a WinLC instance can be used for MPI communication as well as for accessing the instance's I/O. These CP cards are directly accessed by the WinLC instance's execution engine (i.e., access does not use backplane emulation and does not involve the CPU Proxy or the SPC Stub.) This means, for example, that the card is controlled in the real-time environment 105 and that this control is deterministic.

FIGS. 5A-5E show graphical user interfaces, generally denoted by reference numeral 180 and may be created by the SM 116 that provides for configuring a CP card as a submodule of a WinLC instance. FIG. 6 is a flow chart of steps of an embodiment for using the invention that begins at step 210 and is discussed concurrently with FIGS. 5A-5E. FIG. 6 may equally represent a high-level block diagram of components of the invention implementing the steps thereof. The steps of FIG. 6 may be implemented on computer program code in combination with the appropriate hardware. This computer program code may be stored on storage media such as a diskette, hard disk, CD-ROM, DVD-ROM or tape, as well as a memory storage device or collection of memory storage devices such as read-only memory (ROM) or random access memory (RAM). Additionally, the computer program code can be transferred to a workstation over the Internet or some other type of network. FIG. 6 may be substantially implemented via the GUI of FIGS. 5A-5E.

Figure 5A:
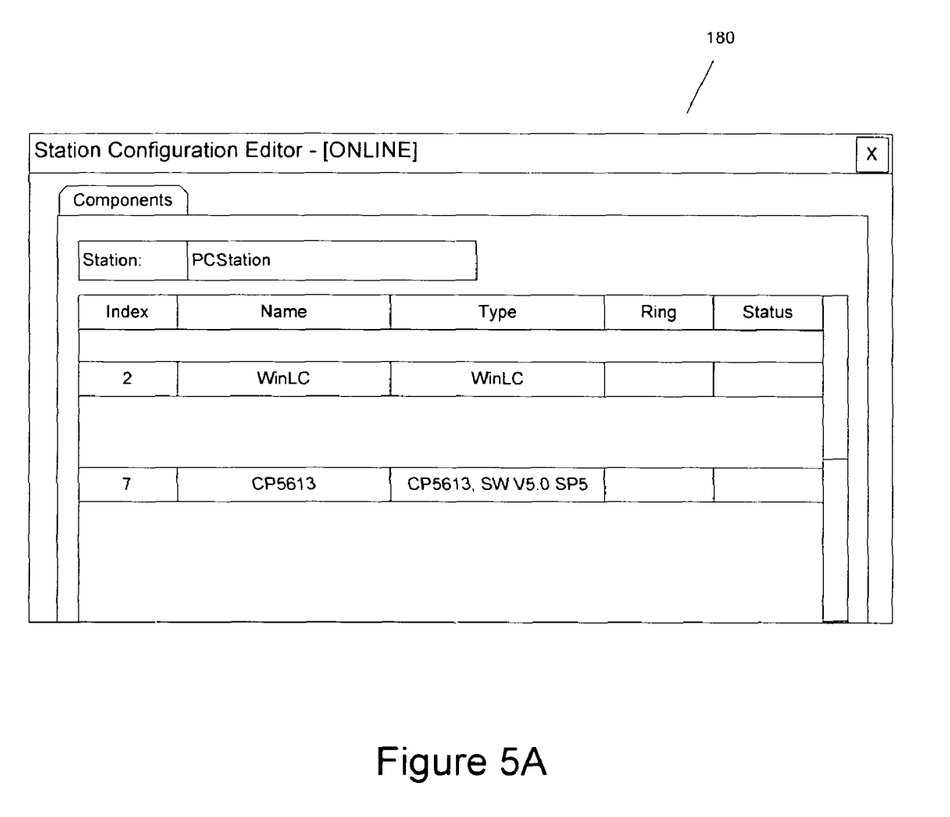
FIGS. 5A-5E are diagrams of a user interface created by a Station Manager that provides for configuring a CP card as a submodule.
Figure 5B:
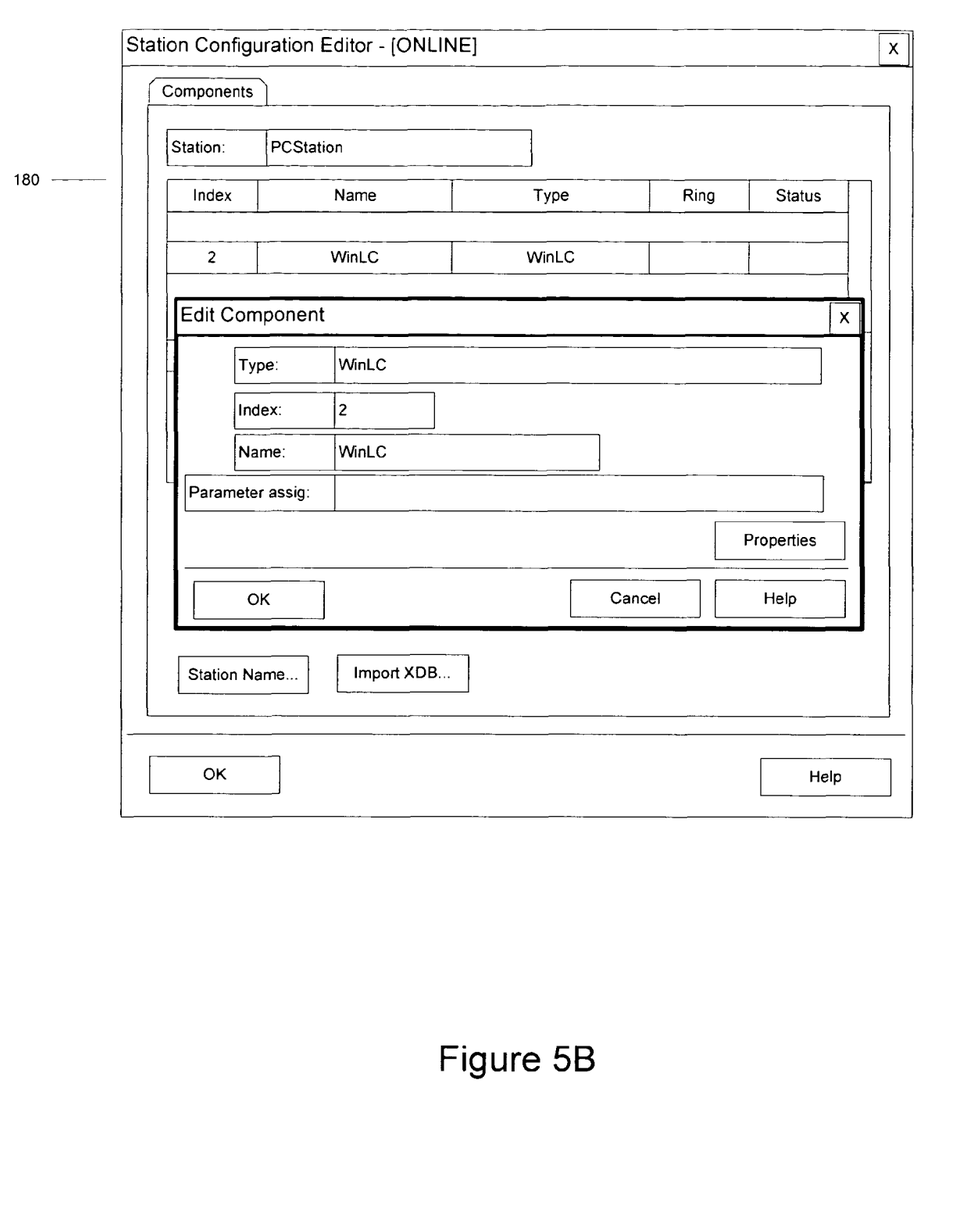

To configure a CP card as a submodule of a WinLC instance, at step 220, the user requests the WinLC instance's properties dialog as follows: select the WinLC instance (e.g., at index 2 of FIG. 5A); select "Edit" from either the right-click menu or from the Edit button; select the "Properties" button from the "Edit Component" dialog (FIG. 5B). At step 230, the "WinLC Properties" dialog will be displayed (FIG. 5C).

Figure 5C:
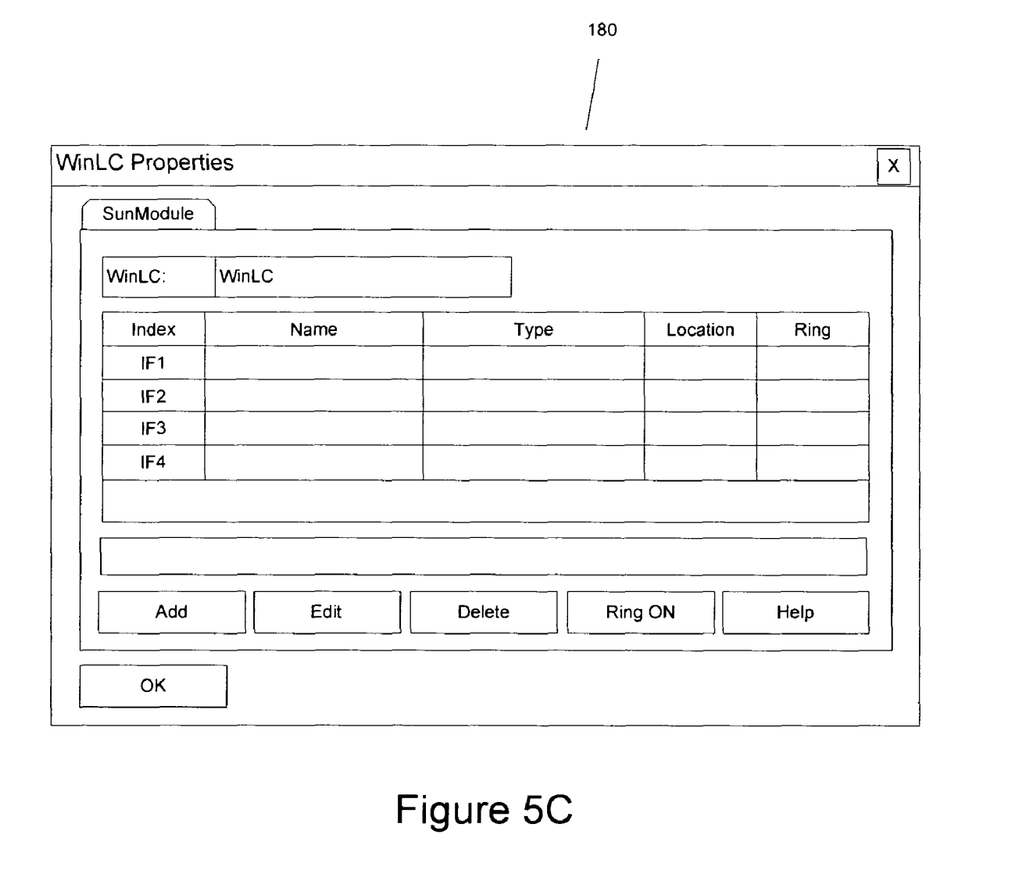
Figure 5D:
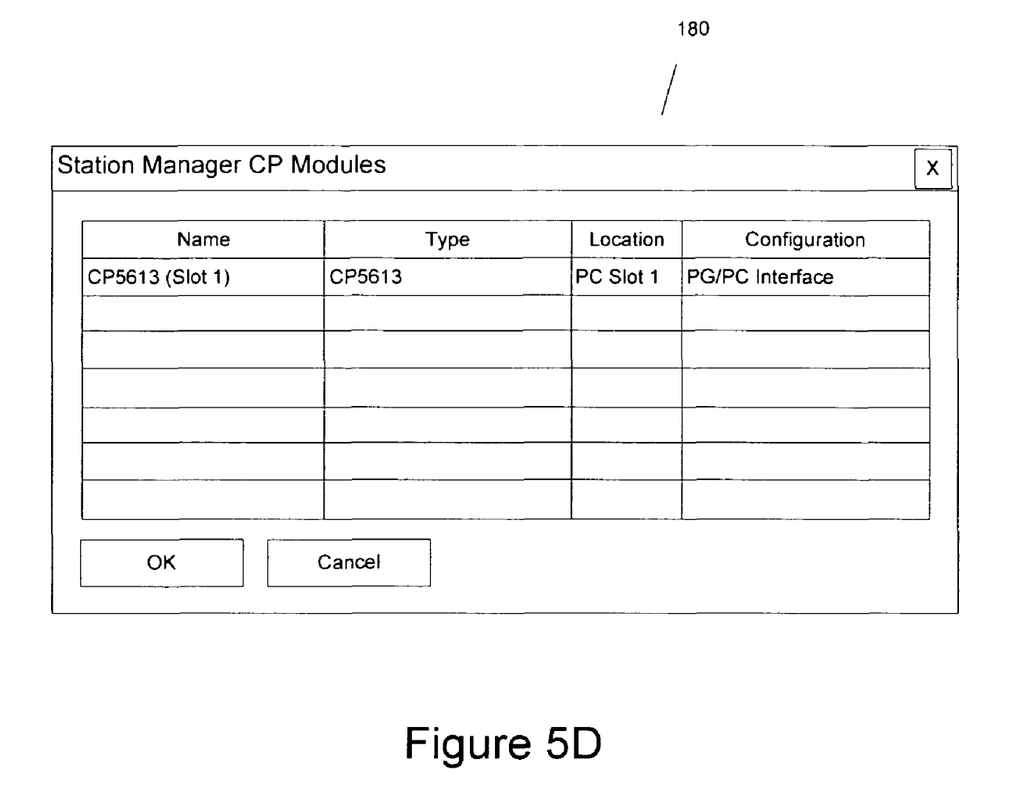
Figure 6:
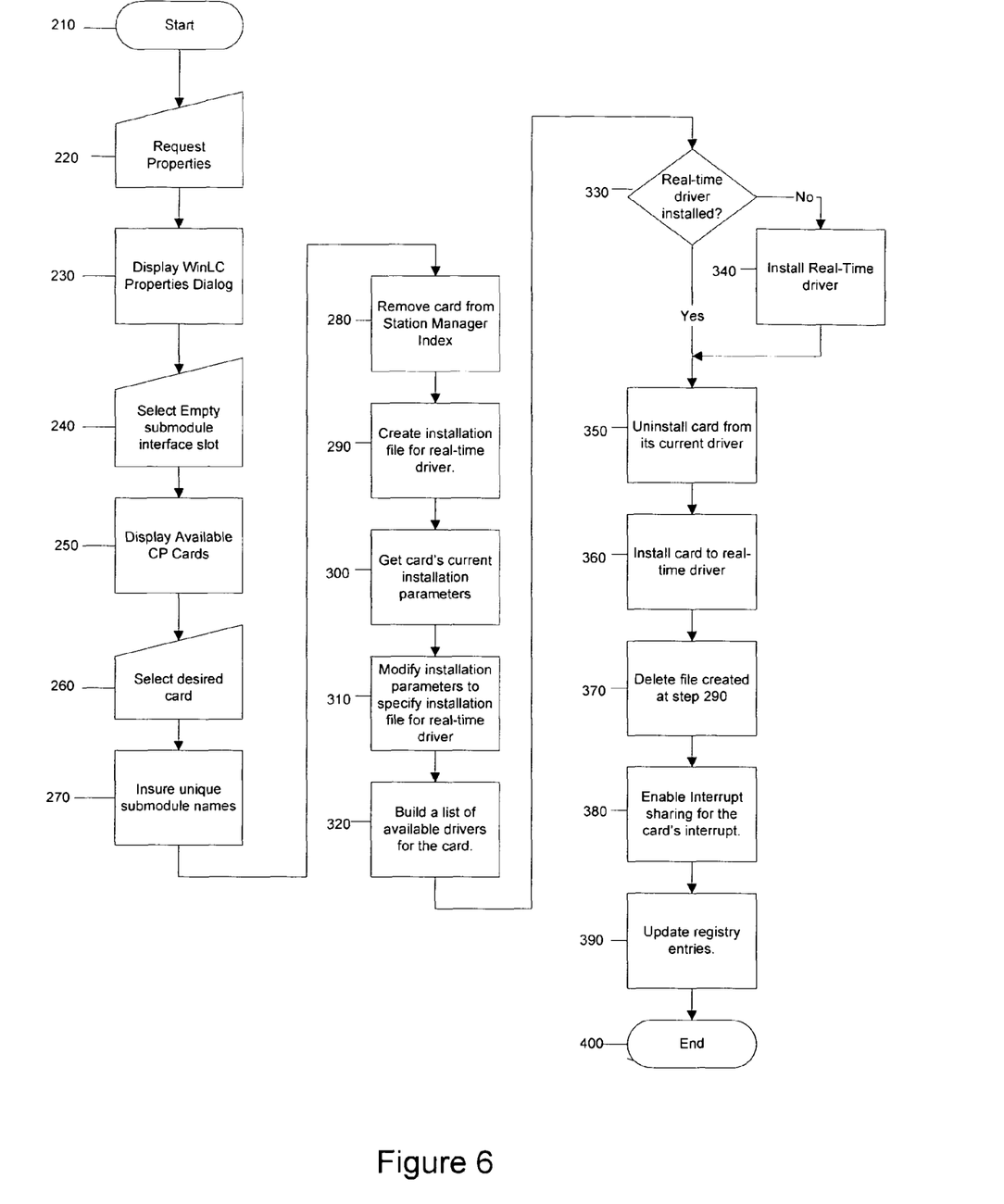
FIG. 6 is a flow chart showing steps of an embodiment for using the invention.

From the WinLC Properties dialog of FIG. 5C and at step 240, the user then selects an empty interface slot (IF), e.g., index IF1-IF4, and the requests the "Add" function from either the right-click menu or from the Add button. At step 250, the "Station Manager CP Modules" dialog is displayed as shown in FIG. 5D. This dialog lists the CP cards (e.g., CP5613) that can be moved from the non-deterministic side 100 (e.g., from the SM's virtual backplane) to the real-time side 105 as a submodule of the WinLC instance.

Figure 5E:
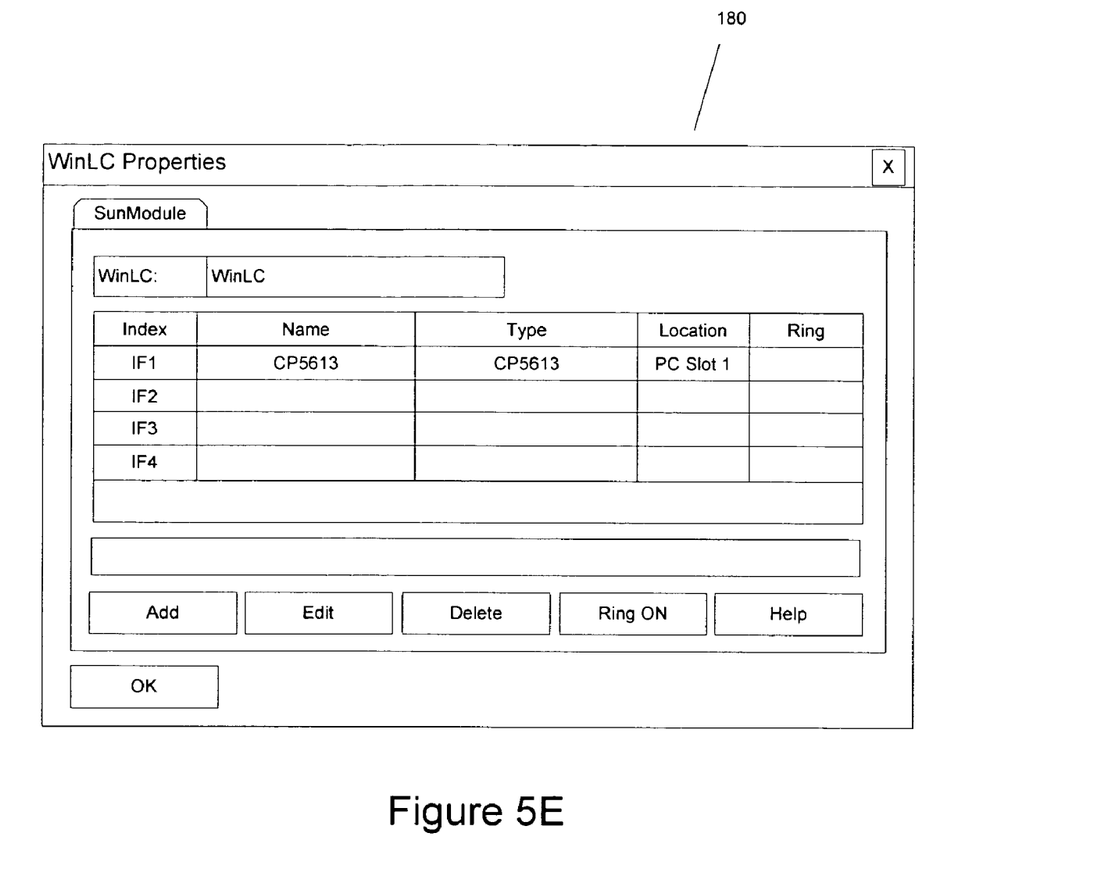

At step 260, selecting a CP card (e.g., index 181) from this list is executed, followed, at step 270, with a check to insure that the submodule name is unique. Clicking the "OK" button causes, at step 280, initiation of a move of the card from the SM's virtual backplane position to the WinLC instance at the selected IF position. The result of the move is shown in FIG. 5E, which shows the CP5613 to reside at interface slot IF1. The sequence above may be repeated as necessary for each card to be moved as a submodule of WinLC.

An aspect of this invention which significantly simplifies the user's task includes the operational steps of moving the CP card from the SM's virtual backplane to the WinLC instance's I/F slot (submodule position). This simple point-and-click user operation hides from a user a sequence of operations as shown in steps 280 through 400 of the flow chart in FIG. 6.

Prior to the user clicking OK in FIG. 5D, at step 280, the CP card exists as a device in the non-deterministic operating system environment. As such, it has a non-deterministic (e.g., Windows Driver Model) device driver and is only available for use by non-deterministic applications, e.g., for use as an MPI (Multi-Point Interface) communication controller. Following the user clicking OK, the CP card is no longer available in the non-deterministic operating system environment. Instead, it is installed as a real-time device with exclusive access by the WinLC instance's execution engine.

The move may be accomplished using the following steps. At step 270, the WinLC Instance Manager 125 validates that the user-assigned name for the card is unique. If not, two actions are possible: the system can generate a unique name; or the user can be prompted to supply a unique name. At step 280, the WinLC Instance Manager 125 invokes the SM 116, instructing it to remove the card from the SM's virtual backplane. At step 290, the WinLC Instance Manager 125 creates an installation file that allows the card to be installed for real-time use. This file may be used to override the normal (non-deterministic) installation of the card, which is specified by the installation file of the card's default driver. At step 300, the installation parameters of the card, as currently installed, are obtained from the operating system. At step 310, the current installation parameters are modified to change the card's installation file from its current setting (referencing the default driver) to reference the installation file created at step 290.

At step 320, a list of compatible drivers satisfying the modified installation parameters is generated and supplied to the Windows Operating System (for example). Due to the manner in which the installation file is created at step 290, this list includes only the real-time driver. At step 330, the operating system is queried to determine whether the real-time driver has been installed. If not, at step 340, the real-time driver will be installed before proceeding. At step 350, the operating system is instructed to uninstall the card. This breaks the card's relationship to the current (non-deterministic) driver and makes the card unavailable for use by applications residing on the non-deterministic side of the architecture 100. At step 360, the operating system is instructed to reinstall the card using the real-time driver. This operation assigns control of the card to the real-time side of the architecture 105, limiting its used to the WinLC instance's execution engine.

At step 370, the installation file created at step 290 is removed from the system. This prevents the operating system from silently installing a subsequently inserted card of the same type to the real-time driver. In other words, all cards typically start out their life assigned to their non-deterministic driver. Explicit user action is required to indicate that a card is to be assigned to the real-time driver and reside in the real-time environment. At step 380, the real-time operating system 105 is instructed, as necessary, to allow the card's interrupt line to be shared with other real-time cards. Since interrupt lines are generally connected to more than one expansion slot (card), this provides a higher potential that multiple cards may be moved to the real-time environment.

At step 390, the WinLC instance's submodule information is updated in the SM's component registry and in the WinLC installed instance registry. The card is now listed as a submodule of the instance. At step 400, control is returned to the User, e.g., as shown in FIG. 5E. The real time environment provides assurance of guaranteed fixed scan cycles with known response time capability to and from devices on the assigned virtual and real ports on the backplane/expansion bus 10. While the steps of FIG. 6 illustrate moving resources from a non-deterministic environment to a deterministic environment, one of ordinary skill in the art would recognize that movement of resources in the reverse direction, i.e., from a deterministic environment to a non-deterministic environment is also possible.

While the invention has been described in terms of embodiments, those skilled in the art will recognize that the invention can be practiced with modifications and in the spirit and scope of the appended claims.

What is claimed is:

1. A method comprising:
reassigning resources in a soft programmable logic controller (PLC), said soft PLC executed on a single computer, said reassigning comprising the steps of:
selecting a first interface in a first operating environment of the soft PLC;
selecting a virtual slot in a second operating environment of the soft PLC for installation of the first interface, wherein said second operating environment has non-variable scan cycle timing;
creating a first installation file in the first operating environment for installation of the first interface in the second operating environment; and
installing the first interface in the second operating environment using the first installation file to reassign a resource between the first operating environment and the second operating environment, an interrupt line of the reassigned resource shared in the second operating environment with at least one real-time card.

2. The method of claim 1, wherein the first operating environment is a non-real time operating environment and the second operating environment is a real time operating environment.

3. The method of claim 1, wherein the second operating environment is a non-real time operating environment and the first operating environment is a real time operating environment.

4. The method of claim 1, wherein the installing step includes installing a real-time device driver.

5. The method of claim 1, wherein the installing step overrides an installation of a device driver associated with the first operating environment.

6. The method of claim 1, during the creating step, installation parameters are obtained from the first operating environment and used in the creation of the first installation file.

7. The method of claim 1, further comprising deleting the first installation file.

8. The method of claim 1, further comprising uninstalling the resource from a device driver associated with the first operating environment.

9. The method of claim 1, further comprising enabling interrupt sharing for the reassigned resource so that an interrupt may be used, for more than one resource.

10. The method of claim 1, further comprising the steps of:

displaying the resource for reassignment; and
selecting an empty interface slot in the second operating environment to receive the resource, the resource being one of a second interface, a card, a device and a port.

11. The method of claim 1, further comprising modifying installation parameters to specify a second installation file for a real-time driver.

12. The method of claim 1, further comprising updating a registry associated with the second operating environment to reflect said reassignment of the resource.

13. A method comprising:
automatically reassigning resources in a soft programmable logic controller (PLC) executed on a single computer, said automatically reassigning comprising the steps of:
identifying a resource to be reassigned from a first processing mode of the soft PLC to a second processing mode of the soft PLC, wherein said second processing mode has non-variable scan cycle timing;
removing the resource from operation in the first processing mode;
creating an installation file containing information of at least one device driver;
assigning the resource for operation in the second processing mode by using installation parameters associated with the first processing mode, an interrupt line of the assigned resource shared in the second processing mode with at least one real-time card; and
automatically installing the at least one device driver for the resource in the second processing mode using the information from the installation file so that any device in communication with the at least one device driver is functional.

14. The method of claim 13, wherein the removing step includes removing the resource from a non-real time processing mode and the assigning step reassigns a card associated with the resource for operation in a real-time operating mode adapted to achieve real-time processing.

15. The method of claim 13, further comprising updating a registry associated with the second processing mode to reflect a reassignment of the resource.

16. The method of claim 13, wherein in the assigning step includes associating the assigned resource with a software component instance.

17. The method of claim 13, further comprising modifying installation parameters to specify the installation file.

18. The method of claim 13, further comprising displaying available resources for reassignment from the first processing mode to the second processing mode and selecting one of the displayed available resources for reassignment.

19. The method of claim 18, including building a list of available drivers for the selected resource.

20. The method of claim 13, in any step, the resource being one of a card, a port, an interface, and a device.

21. A system comprising:
a means for executing a soft programmable logic controller (PLC) on a single computer;
a means for selecting a first interface in a first operating environment of the soft PLC;
a means for selecting a virtual slot in a second operating environment of the soft PLC for installation of the first interface, wherein said second operating environment has non-variable scan cycle timing;
a means for creating an installation file in the first operating environment of the soft PLC for installation of the first interface in the second operating environment of the soft PLC;
a means for installing the first interface in the second operating environment of the soft PLC using the installation file to reassign a resource between the first operating environment of the soft PLC and the second operating environment of the soft PLC, said system adapted to utilize said resource in the soft programmable logic controller (PLC), an interrupt line of the reassigned resource shared in the second operating environment with at least one real-time card.

22. The system of claim 21, further comprising a means for reassigning the resource to a real-time operating environment.

23. The system of claim 21, further comprising a means for installing a real-time device driver.

24. The system of claim 23, wherein the means for installing a real-time device driver overrides an installation of a device driver associated with the first operating environment.

25. The system of claim 21, wherein installation parameters are obtained from the first operating environment and used in the creation of the installation file.

26. The system of claim 21, further comprising a means for deleting the installation file.

27. The system of claim 21, further comprising a means for uninstalling the resource from a current device driver associated with the first operating environment.

28. The system of claim 21, further comprising a means for enabling interrupt sharing for the resource so that more than one resource shares an interrupt.

29. The system of claim 21, further comprising a means for updating a registry associated with the second operating environment to reflect a reassignment of the resource.

30. The system of claim 21, wherein the resource includes one of a port, a second interface, a device, and a card.

31. A non-transitory computer readable medium having computer executable program code stored thereon, the computer executable program code comprising:
a soft programmable logic controller (PLC) executed on a single computer;
a first software component to select an interface in a first operating environment of the soft PLC;
a second software component to select a virtual slot in a second operating environment of the soft PLC for installation of the interface, wherein said second operating environment has non-variable scan cycle timing;
a third software component to create an installation file in the first operating environment of the soft PLC for installation of the interface in the second operating environment of the soft PLC;
a fourth software component to install the interface in the second operating environment of the soft PLC using the installation file to reassign a resource between the first operating environment of the soft PLC and the second operating environment of the soft PLC, an interrupt line of the reassigned resource shared in the second operating environment with at least one real-time card.

* * * * *